US008019965B2

(12) United States Patent
Agombar et al.

(10) Patent No.: US 8,019,965 B2
(45) Date of Patent: Sep. 13, 2011

(54) DATA MIGRATION

(75) Inventors: John P. Agombar, Winchester (GB); Christopher B. Beeken, Hants (GB); Stephanie Machleidt, Andover (GB); Simon Walsh, Hayling Island (GB)

(73) Assignee: International Business Machines Corporation, Armonk, NY (US)

( * ) Notice: Subject to any disclaimer, the term of this patent is extended or adjusted under 35 U.S.C. 154(b) by 640 days.

(21) Appl. No.: 12/128,361

(22) Filed: May 28, 2008

(65) Prior Publication Data
US 2008/0307178 A1 Dec. 11, 2008

(30) Foreign Application Priority Data

May 31, 2007 (EP) .................................... 07109352

(51) Int. Cl.
G06F 12/00 (2006.01)
G06F 13/00 (2006.01)
G06F 13/28 (2006.01)
G06F 9/26 (2006.01)
G06F 9/34 (2006.01)

(52) U.S. Cl. ......... 711/203; 711/112; 711/161; 711/165

(58) Field of Classification Search .................. 711/117, 711/154, 165, 112, 161–162, 203
See application file for complete search history.

(56) References Cited

U.S. PATENT DOCUMENTS

| | | | |
|---|---|---|---|
| 6,032,224 A | 2/2000 | Blumenau | |
| 2002/0161983 A1* | 10/2002 | Milos et al. | 711/202 |
| 2006/0212671 A1* | 9/2006 | Todd | 711/165 |
| 2007/0150690 A1* | 6/2007 | Chen et al. | 711/170 |
| 2007/0174574 A1* | 7/2007 | Kano | 711/165 |
| 2008/0104350 A1* | 5/2008 | Shimizu et al. | 711/165 |
| 2009/0077327 A1* | 3/2009 | Hara | 711/154 |

* cited by examiner

Primary Examiner — Kevin L Ellis
Assistant Examiner — Ryan Bertram
(74) Attorney, Agent, or Firm — Kunzler Needham Massey & Thorpe

(57) ABSTRACT

The present invention provides for a method for managing the storage of data in a computing system that includes a data processor and local physical storage, involving the steps of: defining a virtual storage volume for access by the data processor, the data processor including a local storage pool mapped to the local physical storage and a remote storage pool mapped to physical storage at a remote site, and the virtual storage volume being overallocated with respect to the local storage pool; and migrating data between the local storage pool and the remote storage pool according to a defined migration policy.

17 Claims, 3 Drawing Sheets

DATA MIGRATION

FIELD OF THE INVENTION

The present invention relates to the field of data processing, and in particular, to the management of storage and the migration of data.

BACKGROUND OF THE INVENTION

Enterprises face major storage challenges due to the fast growth of their storage needs, the increased complexity of managing the storage, and the requirement for high availability of storage. Another issue is the amount of physical space, i.e. real estate, required to house the storage and associated processing capability of the data center. This may not be such a problem in locations where real estate is not at premium. However, where enterprises are located in city centers, the cost of the real estate is a real issue. In a city center hospital for example, the data center is responsible for storing many different types of data including patient data. As diagnostic technology advances, there is more and more diagnostic data in digital form that needs to be stored and managed. The hospital thus has to manage a conflict between the ever-increasing real estate requirements of the data center and those of the patient treatment facilities.

Data currency is another storage management issue. It is generally the case that new data will be accessed regularly within the first few days or weeks of its creation, and that gradually over time, the data will be accessed less and less. In a hospital, for example, patient data, such as x-ray data, typically needs to be readily accessible in the short term while the patient is undergoing treatment. Once the treatment is complete, this data may not be required for many years but it is generally necessary to keep such data for legal reasons, for research purposes, or if the patient has further medical problems. As another example, imagine a bank where data is stored regarding share transactions. It is likely that analysis will be run on the share transactions that have happened within the last few days to spot trends. After a week this data is less important as the market will have moved on. After several weeks this data will be irrelevant. The data itself is stored so that it can be accessed by the servers performing the analysis—generally high-powered servers and fast reliable storage, and may be stored as records in a database. Once the data has become less useful, there is no need to store it on the fast (expensive) storage, but it may still need to be accessed occasionally.

The need to provide ready access to much-used data while providing archive storage for little-used data is a problem which has been addressed in a number of ways.

In one scheme, little-used data is moved onto tape and stored at a remote site. This has the advantage that it reduces the amount of physical storage required at the local site but the disadvantage that the access time for the archived data is unacceptably slow. An alternative scheme involves the migration of old data to remote disk storage and the use of data management tools at local and remote sites to handle the migration and retrieval of the data when required. In this scheme, the amount of physical storage required at the local site is reduced and the remote data is more accessible than with the previously described tape storage scheme. However, the management of the remote data is not a trivial task and is complicated by the use of different data management tools on the local and remote sites.

These problems are exacerbated when the local and remote sites use different types of servers, operating systems, etc. A wide variety of techniques based on these schemes have been proposed in the prior art. In U.S. Pat. No. 6,032,224, for example, a method of hierarchical storage of data in a computer is described in which the computer includes an interpreter and a hierarchical performance driver which monitors the rates of access of blocks of data stored on the computer's storage devices and transfers blocks of data accessed infrequently from a faster data storage device to a slower data storage device.

Other possibilities include the storage of all the data at either the local site or the remote site. In the former case, this may not be practicable in areas where real estate costs are high and furthermore, it may be difficult to rapidly increase or decrease the amount of available storage as requirements change. In the latter case, the overall costs of storage may be reduced but the host applications at the local site would require some adaptation to be able to cope with extended I/O access times to the remote storage, which could potentially be located on a different continent. This would impact the operation at the local site and could lead to application errors.

The present invention seeks to address one or more of these problems.

BRIEF SUMMARY OF THE INVENTION

One embodiment of the present invention provides a method for managing the storage of data in a computing system including a data processor and local physical storage, the method comprising the steps of: defining a virtual storage volume for access by the data processor comprising a local storage pool mapped to the local physical storage and a remote storage pool mapped to physical storage at a remote site, the virtual storage volume being overallocated with respect to the local storage pool; and migrating data from the local storage pool to the remote storage pool based on a defined migration policy.

In one embodiment of the present invention, the step of defining a virtual storage volume includes mapping the remote and local storage pools to the overallocated virtual storage volume; each of the storage pools comprising one or more logical volumes defined by a controller attached to the physical storage.

In one embodiment of the present invention, one or more virtual storage volumes are defined at the remote site, each of which are mapped to physical storage devices. In this case, the remote storage pool is mapped to the one or more virtual storage volumes defined at the remote site.

The data migration policy may take a number of different forms. In one method, the step of migrating the data between the local storage pool and the remote storage pool is based on a data usage algorithm. Alternatively, or additionally, the data migration may occur according to a defined schedule. This latter policy is especially useful when it is known ahead of time when data is likely to be required at the local site.

The present invention thus provides an improved data migration technique for migrating data between local storage devices and remote storage devices. The technique makes use of virtualized storage pools that are mapped over local and remote physical storage to allow local overallocation of storage pools. Data is migrated from local physical storage to remote physical storage based on, for example, recency of use, while all data continues to appear to be local to the user of the local system. This allows the system to maintain only a small amount of local physical storage and therefore reduces the need for physical space (i.e., real estate) at the local site.

Other aspects of the invention include a storage controller, a computer system, a computer network, and a computer program as defined in the appended claims.

DETAILED DESCRIPTION OF THE INVENTION

One embodiment of the present invention is implemented as a Storage Area Network (SAN). In general terms, a SAN is an architecture to attach remote computer storage devices such as disk array controllers, tape libraries, and CD arrays to servers in such a way that to the operating system the devices appear as locally attached devices. This is achieved by employing storage virtualization as a storage management technology to mask the physical storage complexities from the user.

Storage Virtualization may take place at the level of volumes, individual files, or at the level of blocks that represent specific locations within a disk drive. Block virtualization (sometimes also called block aggregation) provides servers with a logical view of the physical storage, such as disk drives, solid-state disks, and tape drives, on which data is actually stored. The logical view may comprise a number of virtual storage areas into which the available storage space is divided (or aggregated) without regard to the physical layout of the actual storage. The servers no longer see specific physical targets, but instead see logical volumes which can be for their exclusive use. The servers send their data to the virtual storage areas as if they are their direct-attached property. Block aggregation can be performed within hosts (servers), in the storage network (storage routers, storage controllers), and/or in storage devices (intelligent disk arrays).

Figure 1:
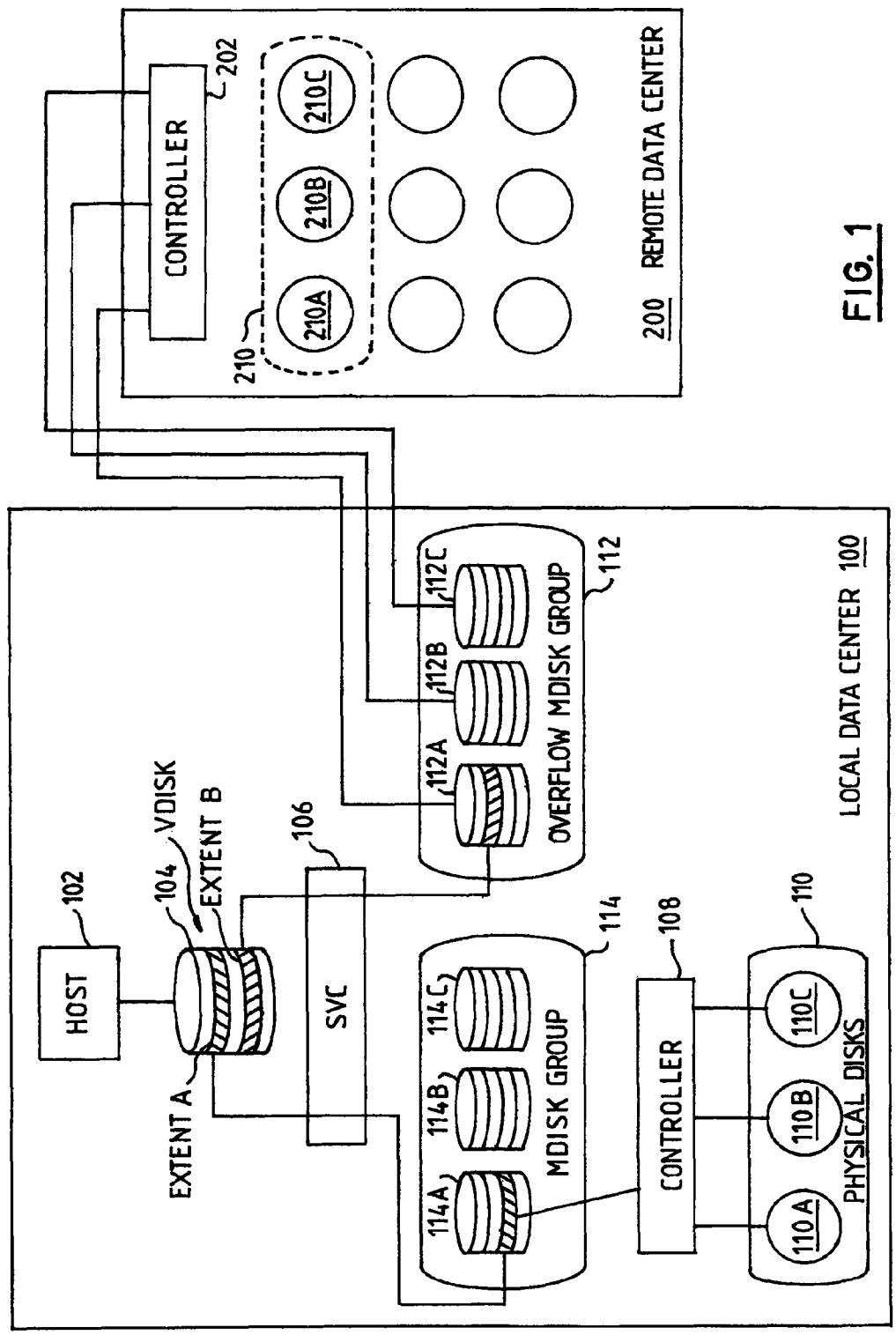
FIG. 1 illustrates a network comprising a local data center connected to a remote data center according to an embodiment of the invention.

Referring to FIG. 1, there is shown a Storage Area Network (SAN) comprising a local data center 100 connected to a remote data center 200. The local data center includes a host system 102 which may be a server running a variety of applications. Where the local data center is located in a hospital, the host system may be used to process and manage patient data for example. Multiple user systems (not shown in FIG. 1), e.g., in the form of desktops and laptops, will likely be connected to the server of the local data center.

Also included in the local data center is a storage virtualization controller 106 which may take the form of a SAN Volume Controller (SVC), such as an IBM SAN Volume Controller. The SVC is a block storage virtualization appliance which implements an indirection or "virtualization" layer in a Fibre Channel Storage Area Network (SAN). Further information on the capabilities and operation of the SVC are described in IBM Redbook "IBM System Storage SAN Volume Controller." In FIG. 1, the SVC sits in the data path between the host system and a set of physical storage devices, e.g., in the form of disk storage devices 110, and presents a virtual disk (vdisk) 104 to the host system.

The local storage disks 110A, 110B, 110C are managed by controller 108 which may be a RAID controller. As discussed in more detail in the aforementioned IBM Redbook, the RAID controller presents the physical disks to the SVC as logical disks that are known as managed disks (mdisks). These mdisks are split into extents—fixed size blocks of usable capacity—which are numbered sequentially from the start to the end of each mdisk. The SVC is employed to group together the mdisks 114A, 114B, 114C in a storage pool known as a Managed Disk Group or mdisk group 114. The mdisk extents can be concatenated, striped, or any desirable algorithm can be used to produce the larger virtual disk which is presented to the host by the SVC. The SVC converts Logical Block Addresses (LBAs) to extents of the vdisk, and maps extents of the vdisk to mdisk extents.

Traditionally, virtual storage involves combining discrete storage devices of relatively small storage capacity into a virtual storage device of much larger capacity as viewed from the host. While this arrangement is often called storage virtualization, this is not true storage virtualization, since the actual physical storage capacity backs up the virtual device, and thus the amount of storage that a host believes is available, actually is available. The present invention makes use of a known technique called overallocation to provide improved storage management. One such technique is disclosed in U.S. Patent Publication 2002/0161983, the contents of which are hereby incorporated by reference.

In the embodiment of the present invention depicted in FIG. 1, the use of overallocation has the result that the vdisk is defined by the SVC to comprise a total storage capacity that is greater than the actual amount of physical storage available at the local data center. In operation, the overallocated vdisk is not mapped to specific extents in an mdiskgroup until that extent is written to by the host system. At that time, an extent from the mdiskgroup is mapped to the vdisk and the data written to it.

As further depicted in FIG. 1, the local data center is connected to a remote data center 200 which comprises a large amount of storage capacity in the form of storage disks, tape drives, or other mass storage devices. Although the remote data center may be owned by the organization that owns the local data center, it is increasingly likely to be operated by a separate company that offers the remote data center as a storage pool for multiple enterprises, where additional storage is provided for a fee. In the present invention, a controller 202 in the remote data center is employed to present a second mdiskgroup 112, known as the overflow mdiskgroup, to the SVC in the local data center. As with the local mdiskgroup 114, the extents of the overflow mdiskgroup are mapped to extents of the overallocated vdisk. Thus two storage pools are mapped to the vdisk in the local data center—a local storage pool in the form of local mdiskgroup which maps to local storage and an overflow mdiskgroup which maps to storage at the remote data center. The host system is unaware of this division and may access data from vdisk extents that are mapped to either of the local or overflow mdiskgroups. For example, FIG. 1 shows that extent A on vdisk 104 is mapped to an extent on mdisk 114A in local mdiskgroup 114. Extent B is mapped to an extent on mdisk 112A in overflow mdiskgroup 112.

As previously discussed, the vdisk is defined initially by the user of the host system to have a storage capacity that is greater than the capacity of the local physical storage. For example, it may be defined to be equal to the capacity of the local physical storage plus the capacity of remote storage that is likely to be required by the host system. In a hospital environment, the vdisk may comprise hundreds of terabytes, of which only five to ten percent may be provided by the local physical storage. In an example system, the local data center may comprise a vdisk of 100 terabytes and physical storage in the local mdiskgroup of 10 terabytes. The remote data center may comprise a reserve of 30 terabytes mapped to the overflow mdiskgroup of the local data center.

The local host will generally first write data to extents on the local mdiskgroup. That is to say, data will not generally be first written to extents of the overflow mdiskgroup. Unused data will be migrated to the remote mdiskgroup which will cause extents to be consumed at the remote data center. In one arrangement, the local data center pays for storage that is actually consumed at the remote data center. Alternatively, the local data center pays for the full amount of reserved storage. If and when the whole of the reserved storage at the remote data center is consumed, further remote storage is readily mapped to the overflow mdiskgroup without the need to expand the physical storage at the local data center. In addition, the vdisk will usually be defined initially to be large enough to encompass the anticipated additional storage requirements without the need to expand the capacity of the vdisk; though this may be done if required.

The system of FIG. 1 makes use of the technique of data migration provided by the SVC. In this technique, extents (or smaller portions of data) in one mdiskgroup are migrated by the SVC to extents on other mdiskgroups. Thus, in this embodiment, an extent on one mdisk of the local mdiskgroup can be migrated to an extent on one mdisk of the overflow mdiskgroup. In physical terms therefore, data is moved from local storage to remote storage under the control of the local SVC and using the controller 202 of the remote data center.

Various algorithms may be employed to determine when data is migrated from the local to overflow mdisks. For example, data that has not been accessed for a defined period of time is automatically migrated. Alternatively, when the amount of data stored locally reaches a threshold, the last accessed data is migrated to the remote storage until the amount of data stored locally goes below a threshold amount. In some systems, it may be useful to use a migration policy where certain types of data are migrated to remote storage as soon as they are written locally. These migration policies may be used alone or in combination depending on the type of data. Other migration policies will be apparent to those skilled in the art.

As with data migration from the local to the remote storage, there are a number of different policies that may be used in pulling data from remote storage to local storage. For example, a migration from the remote data center could be triggered when the host system performs a read of that data. Alternatively, the migration from the remote to the local storage may occur according to a defined schedule. For example, it may be possible to define ahead of time when particular remote data will be required locally. In this case, a schedule may be implemented whereby the required data is prestaged to local storage at some defined period of time ahead of the required time. For example, in a hospital environment, the patient appointment schedule may be used to pull diagnostic and/or other data from the remote storage such that the data is stored locally when the physician needs to access it during the appointment.

Figure 2:
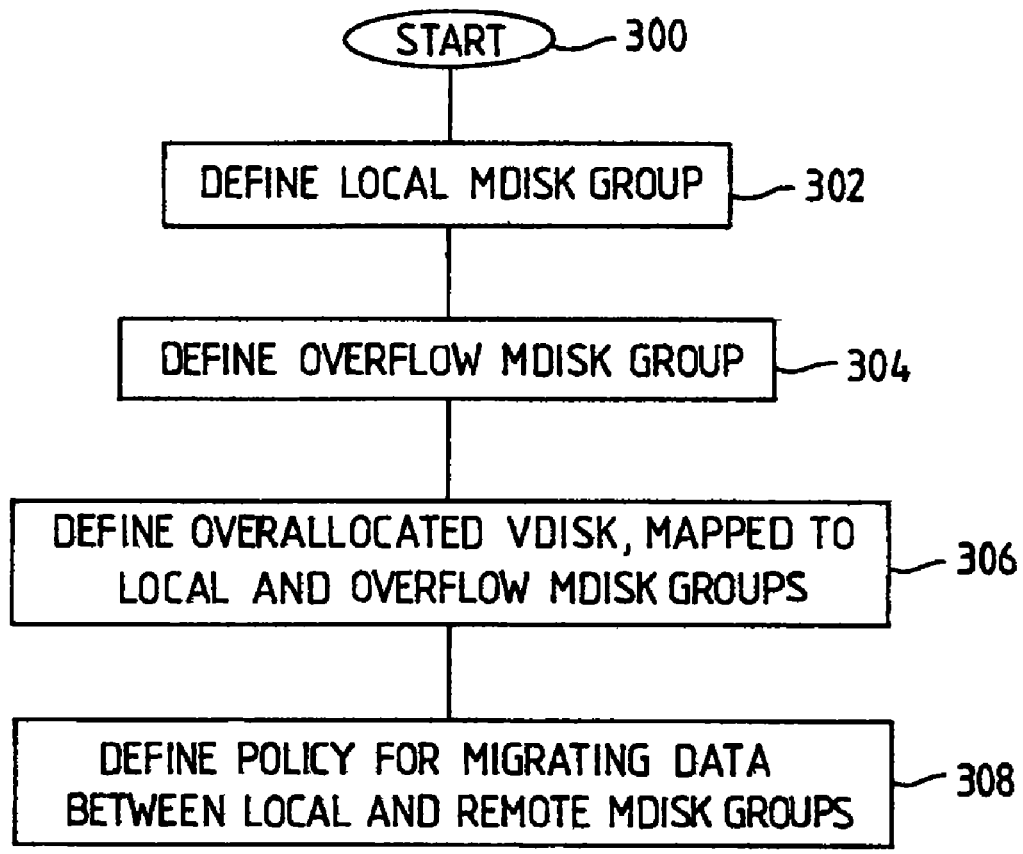
FIG. 2 is a flow diagram of the storage management technique according to an embodiment of the invention.

FIG. 2 shows the steps carried out by the storage virtualization controller and other components of the local data center to implement the storage management technique of one embodiment of the present invention. The order in which the steps are presented in FIG. 2 is not significant. In step 302, the local mdiskgroup is defined by the SVC, which is made up of logical mdisks presented to the SVC by the physical disk controller at the local data center. In step 304, the overflow mdiskgroup is defined by the SVC, made up from logical mdisks presented to the SVC by the controller in the remote data center. In step 306, the overallocated vdisk is defined and mapped to the local and overflow mdiskgroups. In step 308, a suitable migration policy is defined for migrating data between the local and remote mdiskgroups. The policy may be defined via a GUI on the host system or a user system attached to the host. As the requirements of the local data center organization change, the data migration policies may also be changed.

Figure 3:
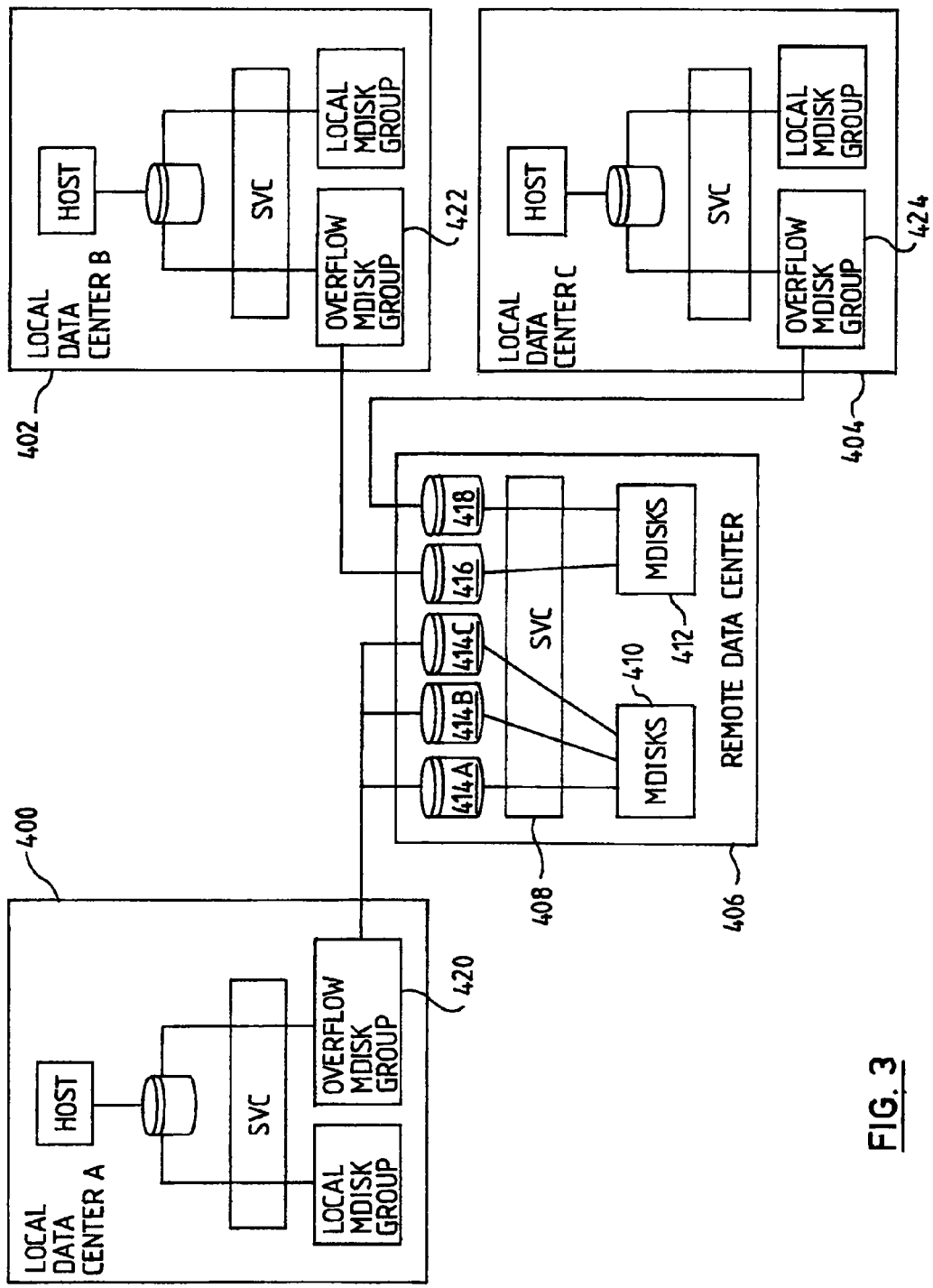
FIG. 3 illustrates a remote data center connected to three local data centers according to an embodiment of the invention.

FIG. 3 shows a storage area network in which multiple local data centers 400, 402, 404 are connected to one remote data center 406. Each local data center has the same configuration as the local data center 100 of FIG. 1 but the local physical disks and disk controller have been omitted from FIG. 3 for the sake of clarity. The remote site 406 is different from that shown in FIG. 1 in that it takes advantage of storage virtualization to provide additional storage capability for the local data centers. In the remote data center, SVC 408 maps two sets of mdisks to a plurality of vdisks 414. Mdiskgroup 410 is mapped by SVC to vdisks 414A-414C which are in turn mapped to overflow mdiskgroup 420 in local data center A. Mdisks 412 are mapped to vdisk 416 (which is mapped to overflow mdiskgroup 422 of local data center B) and to vdisk 418 which is mapped to overflow mdiskgroup 424 of local data center C. The use of storage virtualization at the remote site allows greater flexibility in that the remote vdisks can be expanded on demand.

Thus has been described an embodiment in which virtualized storage pools are mapped over local and remote physical storage to allow local overallocation of storage pools, wherein data is migrated from local physical storage to remote physical storage based on, for example, recency of use, while all data continues to appear to be local to the user of the local system.

It will be clear to one skilled in the art that the method of the present invention may suitably be embodied in a logic apparatus comprising logic means to perform the steps of the method, and that such logic means may comprise hardware components or firmware components.

Insofar as embodiments of the invention described are implementable, at least in part, using a software-controlled programmable processing device, such as a microprocessor, digital signal processor, or other processing device, data processing apparatus, or system, it will be appreciated that a computer program for configuring a programmable device, apparatus, or system to implement the foregoing described methods is envisaged as an aspect of the present invention. The computer program may be embodied as source code or undergo compilation for implementation on a processing device, apparatus, or system, or may be embodied as object code, for example.

Suitably, the computer program is stored on a carrier medium in machine or device readable form, for example, in solid-state memory, magnetic memory such as disc or tape, optically or magneto-optically readable memory such as compact disk (CD) or Digital Versatile Disk (DVD), etc., and the processing device utilizes the program or a part thereof to configure it for operation. The computer program may be supplied from a remote source embodied in a communications medium such as an electronic signal, radio frequency carrier wave, or optical carrier wave. Such carrier media are also envisaged as aspects of the present invention.

It will be understood by those skilled in the art that, although the present invention has been described in relation to the preceding example embodiments, the invention is not limited thereto and that there are many possible variations and modifications which fall within the scope of the invention.

What is claimed is:

1. A method for managing the storage of data in a computing system including a data processor and local physical storage, comprising:
   mapping a local storage pool to the local physical storage and mapping a remote storage pool to physical storage at a remote site;
   defining a virtual storage volume for access by the data processor, wherein the virtual storage volume presents a single virtual disk to the computing system, and wherein the virtual storage volume is overallocated from the local storage pool to represent more storage capacity than is available at the local storage pool, wherein total size of the virtual storage volume comprises a total storage capacity of the local storage pool combined with at least a portion of a total storage capacity of the remote storage pool;
   writing data received at the virtual storage volume to the local storage pool during usage of the virtual storage volume, wherein the virtual storage volume is not mapped to an extent in the local storage pool until the extent is written by the computing system; and
   migrating data between the local storage pool and the remote storage pool according to a defined migration policy, wherein the defined migration policy is configured to enable data migration from the local storage pool to the remote storage pool before the total storage size of the local storage pool is consumed, and wherein the virtual storage volume is not mapped to an extent in the remote storage pool until the extent is migrated to the remote storage pool.

2. The method as in claim 1, wherein the local storage pool has a smaller capacity than the remote storage pool.

3. The method as in claim 1, wherein the step of defining a virtual storage volume further includes mapping the remote and local storage pools to the overallocated virtual storage volume.

4. The method as in claim 1, wherein each of the storage pools comprises one or more logical volumes defined by a controller attached to the physical storage.

5. The method as in claim 4, wherein the remote storage pool is mapped to one or more virtual storage volumes defined at the remote site.

6. The method as in claim 1, wherein the step of migrating data between the local storage pool and the remote storage pool is based on a data usage algorithm.

7. The method as in claim 1, wherein data is migrated from the remote storage pool to the local storage pool according to a defined schedule.

8. A storage controller for a data processing system comprising:
   a host processor and local physical storage operably coupled to the storage controller, the storage controller performing the actions of:
   mapping a local storage pool to the local physical storage and mapping a remote storage pool to physical storage at a remote site;
   defining a virtual storage volume for access by the host processor, wherein the virtual storage volume presents a single virtual disk to the computing system, and wherein the virtual storage volume is overallocated from the local storage pool to represent more storage capacity than is available at the local storage pool, wherein total size of the virtual storage volume comprises a total storage capacity of the local storage pool combined with at least a portion of a total storage capacity of the remote storage pool;
   writing data received at the virtual storage volume to the local storage pool during usage of the virtual storage volume, wherein the virtual storage volume is not mapped to an extent in the local storage pool until the extent is written by the computing system; and
   migrating data between the local storage pool and the remote storage pool according to a defined migration policy, wherein the defined migration policy is configured to enable data migration from the local storage pool to the remote storage pool before the total storage size of the local storage pool is consumed, and wherein the virtual storage volume is not mapped to an extent in the remote storage pool until the extent is migrated to the remote storage pool.

9. The storage controller as in claim 8, wherein the local storage pool has a smaller capacity than the remote storage pool.

10. The storage controller as in claim 8, the storage controller further performing the action of mapping the remote and local storage pools to the overallocated virtual storage volume.

11. The storage controller as in claim 8, wherein each of the storage pools comprises one or more logical volumes defined by a controller attached to the physical storage.

12. The storage controller as in claim 8, wherein migrating data between the remote storage pool and the local storage pool occurs according to a defined schedule.

13. The storage controller as in claim 8, wherein migrating data between the local storage pool and the remote storage pool occurs based on a data usage algorithm.

14. A computer system, comprising:
   a host processor, physical storage and a storage controller located in the data path between the processor and storage, the storage controller being operable to perform the actions of:
   mapping a local storage pool to the local physical storage and mapping a remote storage pool to physical storage at a remote site;
   defining a virtual storage volume for access by the host processor, the virtual storage volume presenting a single virtual disk to the computing system, wherein the virtual storage volume is overallocated from the local storage pool to represent more storage capacity than is available at the local storage pool, and wherein total size of the virtual storage volume comprises a total storage capacity of the local storage pool combined with at least a portion of a total storage capacity of the remote storage pool;
   writing data received at the virtual storage volume to the local storage pool during usage of the virtual storage volume, wherein the virtual storage volume is not mapped to an extent in the local storage pool until the extent is written by the computing system; and
   migrating data between the local storage pool and the remote storage pool according to a defined migration policy, wherein the defined migration policy is configured to enable data migration from the local storage pool to the remote storage pool before the total storage size of the local storage pool is consumed, and wherein the virtual storage volume is not mapped to an extent in the remote storage pool until the extent is migrated to the remote storage pool.

15. A computer network, comprising:
   a local data processing system, including a host processor, physical storage and a storage controller; and
   a remote data processing system, comprising remote physical storage;

wherein the storage controller is operable to perform the actions of:
- mapping a local storage pool to the local physical storage and mapping a remote storage pool to the remote physical storage;
- defining a virtual storage volume for access by the host processor, the virtual storage volume presenting a single virtual disk to the computing system, and the virtual storage volume being overallocated from the local storage pool to represent more storage capacity than is available at the local storage pool, wherein total size of the virtual storage volume comprises a total storage capacity of the local storage pool combined with at least a portion of a total storage capacity of the remote storage pool;
- writing data received at the virtual storage volume to the local storage pool during usage of the virtual storage volume, wherein the virtual storage volume is not mapped to an extent in the local storage pool until the extent is written by the computing system; and
- migrating data between the local storage pool and the remote storage pool according to a defined migration policy, wherein the defined migration policy is configured to enable data migration from the local storage pool to the remote storage pool before the total storage size of the local storage pool is consumed, and wherein the virtual storage volume is not mapped to an extent in the remote storage pool until the extent is migrated to the remote storage pool.

16. The computer network as claimed in claim 15, wherein the remote storage pool is mapped to one or more virtual storage volumes defined by a storage controller at the remote data processing system.

17. A computer program product comprising a computer useable medium having a computer readable program, wherein the computer readable program when executed on a computer causes the computer to:
- map a local storage pool to the local physical storage and mapping a remote storage pool to physical storage at a remote site;
- define a virtual storage volume for access by the data processor, the virtual storage volume presenting a single virtual disk to the computing system, and the virtual storage volume being overallocated from the local storage pool to represent more storage capacity than is available at the local storage pool, wherein total size of the virtual storage volume comprises a total storage capacity of the local storage pool combined with at least a portion of a total storage capacity of the remote storage pool;
- write data received at the virtual storage volume to the local storage pool during usage of the virtual storage volume, wherein the virtual storage volume is not mapped to an extent in the local storage pool until the extent is written by the computing system; and
- migrate data between the local storage pool and the remote storage pool according to a defined migration policy, wherein the defined migration policy is configured to enable data migration from the local storage pool to the remote storage pool before the total storage size of the local storage pool is consumed, and wherein the virtual storage volume is not mapped to an extent in the remote storage pool until the extent is migrated to the remote storage pool.

* * * * *